United States Patent [19]
Lai

[11] Patent Number: 5,610,204
[45] Date of Patent: Mar. 11, 1997

[54] METHOD OF CURING METHACRYLATE-BASED COMPOSITIONS

[75] Inventor: Yu-Chin Lai, Pittsford, N.Y.

[73] Assignee: Bausch & Lomb Incorporated, Rochester, N.Y.

[21] Appl. No.: 652,182

[22] Filed: May 23, 1996

Related U.S. Application Data

[63] Continuation of Ser. No. 280,694, Jul. 26, 1994, abandoned.

[51] Int. Cl.$^6$ .............. C08F 2/46; C08F 24/00; G02C 7/04
[52] U.S. Cl. .............. 522/44; 522/182; 523/106; 351/160 R
[58] Field of Search .............. 522/44, 182; 523/106; 351/160 R

[56] References Cited

U.S. PATENT DOCUMENTS

| | | | |
|---|---|---|---|
| 4,486,577 | 12/1984 | Mueller et al. | 525/474 |
| 4,508,884 | 4/1985 | Wittmann et al. | 526/279 |
| 4,605,712 | 8/1986 | Mueller et al. | 525/474 |
| 4,620,954 | 11/1986 | Singer et al. | 264/1.4 |
| 4,649,062 | 3/1987 | Kosiorek et al. | 427/54.1 |
| 4,719,248 | 1/1988 | Bambury et al. | 523/108 |
| 4,766,160 | 8/1988 | Bichon et al. | 522/46 |
| 4,900,763 | 2/1990 | Kraushaar | 522/14 |
| 4,977,229 | 12/1990 | Culberson et al. | 528/26 |
| 5,154,861 | 10/1992 | McBrierty et al. | 522/2 |
| 5,183,831 | 2/1993 | Bielat et al. | 522/33 |
| 5,196,493 | 3/1993 | Gruber et al. | 526/245 |
| 5,198,477 | 3/1993 | von der Haegen et al. | 523/106 |
| 5,457,140 | 10/1995 | Nunez et al. | 523/106 |

FOREIGN PATENT DOCUMENTS 2178435  2/1987  United Kingdom .......... C08F 220/26

OTHER PUBLICATIONS

"Photoinitiated Radical Polymerization" by S. Peter Pappas, Journal of Radiation Curing, Jul. 1987.

*Primary Examiner*—Mark Chapman
*Attorney, Agent, or Firm*—John E. Thomas

[57] ABSTRACT

A method of improving the polymerization rate and physical properties of a polymerizable methacrylate-containing hydrogel composition by decreasing the time required to achieve the polymerization peak time.

21 Claims, No Drawings

METHOD OF CURING METHACRYLATE-BASED COMPOSITIONS

This is a continuation of application Ser. No. 08/280,694 filed on Jul. 26, 1994, now abandoned.

BACKGROUND OF THE INVENTION

The present invention relates to the use of UV initiators to polymerize (meth)acrylate-based monomers.

The manufacture of hydrogel contact lenses requires a careful balancing of numerous physical properties. For example, a hydrogel contact lens must achieve a certain minimum desired water content. The water content in combination with the chemical composition of the hydrogel material affect the potential oxygen permeability of the material. Without adequate access to oxygen, the cornea, which depends upon direct contact with environmental oxygen for its oxygenation, will become irritated and sustain damage. Therefore, oxygen permeability is important.

Equally important, for a lens to be worn comfortably on the eye, it must have the proper "feel". Many factors contribute to a clinically comfortable lens which has the proper "feel". Modulus is a measure of the material's stiffness. A lens material with a high modulus value will result in a lens which is too stiff to be worn comfortably. However, a lens having a low modulus value, and which is too "soft", may be easily damaged and cannot be easily handled during insertion into, and removal from the eye.

Making the lens sufficiently durable can therefore impact directly on the comfort of the lens in terms of raising the modulus value. The tear strength of the lens must be high enough for the lens to endure the necessary rigors of lens maintenance including cleaning, disinfecting, etc. Unfortunately, when one attempts to lower the modulus of a hydrogel material by known methods, the tear strength also drops. Similarly when one attempts to increase a hydrogel's durability by increasing the tear strength using known methods, the modulus also often increases, making the hydrogel lens material too stiff to be worn comfortably.

Modulus and tear strength may be adjusted by changing the relative concentrations of components known to affect those specific physical properties. In arriving at an acceptable hydrogel contact lens formulation, a balance is usually struck between acceptable, although not ideal, modulus and tear strength values. This balance often results in hydrogel lens materials which have an average comfort in terms of modulus and average durability in terms of material tear strength.

SUMMARY OF THE INVENTION

The present invention is a method of making a hydrogel from a polymerizable methacrylate-containing monomer mixture containing a UV photoinitiator. The monomer mixture polymerizes at a rate such that the peak time of the polymerization reaction of the monomer mixture is achieved in less than about 3 minutes. In one embodiment, a method is disclosed for improving the physical characteristics of a 2-hydroxyethyl methacrylate-containing hydrogel contact lens material made from a polymerizable monomer mixture comprising adding 2,2-dimethoxy-2-phenylacetophenone to the monomer mixture as the UV photoinitiator in an amount of from about 0.1 to about 1.0 weight percent.

It has now been surprisingly found that when the polymerization rate of the monomer mixture is increased through an increased concentration of a UV photoinitiator, but to an amount below which screening effects occur, the multiple and interdependent physical properties of modulus and tear strength in the polymerized hydrogel were both improved (i.e. a higher tear strength and lower modulus were simultaneously effected). It is believed that such an advance will result in a much more comfortable hydrogel contact lens material than was possible to produce previously, according to known methods.

DETAILED DESCRIPTION OF THE INVENTION

Hydrogels are hydrophilic polymers that absorb water to an equilibrium value and are insoluble in water due to the presence of a three-dimensional network. Hydrogels are generally formed of a copolymer of at least one hydrophilic monomer and a crosslinking monomer. The hydrophilicity is due to the presence of hydrophilic groups, such as alcohols, carboxylic acids, amides and sulfonic acids. The swollen equilibrated state results from a balance between the osmotic driving forces that cause the water to enter the hydrophilic polymer and the forces exerted by the polymer chains in resisting expansion.

Materials useful for the manufacture of "soft" contact lenses (e.g. hydrogel lenses) are generally formed of a copolymer of at least one hydrophilic monomer and a crosslinking monomer. Useful hydrophilic monomers include unsaturated carboxylic acids, such as methacrylic acid and acrylic acid; (meth)acrylic substituted alcohols or glycols such as 2-hydroxyethyl methacrylate (HEMA), glyceryl methacrylate, and polyethyleneglycol methacrylate; vinyl lactams, such as N-vinyl-2-pyrrolidone; and acrylamides, such as methacrylamide and N,N-dimethylacrylamide. The 2-hydroxyethyl methacrylate (HEMA)-containing monomers are particularly preferred and are preferably present in the monomer mixtures of the present invention in an amount of from about 40 to about 98 weight percent, more preferably from about 50 to about 95 weight percent, and most preferably about 70 to 90 weight percent.

Notations such as "(meth)acrylate" or "(meth)acrylamide" are used herein to denote optional methyl substitution. Thus, for example, methyl (meth)acrylate includes both methyl acrylate and methyl methacrylate, and N-alkyl (meth)acrylamide includes both N-alkyl acrylamide and N-alkyl methacrylamide.

The photoinitiators used to polymerize the monomer mixtures of the present invention are ultraviolet, or UV initiators. Such initiators are well known. Preferred initiators for use in this invention are benzil ketals, such as the acetophenone derivatives 2,2-diethoxyacetophenone and 2,2-dimethoxy-2-phenylacetophenone; halogenated alkyl aryl ketones, and α-hydroxy-α-cyclohexyl phenyl ketone. A particularly preferred initiator is 2,2-dimethoxy-2-phenylacetophenone (referred to herein as "DMPAP" and commercially available as Irgacure-651-EM Industries).

The specific photoinitiator selected, and its concentration, along with the composition of the monomer mix, will determine the polymerization rate of the monomer mix formulation. Polymerization rate may be characterized in terms of peak time—the point early in the polymerization when the polymerization reaction is at its most intense point. The polymerization rate may also be characterized in terms of stall time—the point in time when the polymerization reaction is deemed to be complete.

As increasing amounts of photoinitiators are added to monomer mixtures, polymerization rate increases. However, photoinitiator concentration can only be increased up to the point at which the initiator itself begins to absorb the UV radiation near the surface of the formulation and interferes with the proper homogeneous polymerization of the monomer mix. When an excess of initiator is used which inhibits proper polymerization, the initiator is said to exhibit screening effects on the monomer mixture being polymerized. Therefore one is unable to add an infinite amount of photoinitiator to get an infinitely quick polymerization rate.

To further illustrate peak and stall times, consider the polymerization of a 2-hydroxyethyl methacrylate (HEMA)-containing monomer mixture of the present invention. An amount of UV photoinitiator is present in the monomer mixture and the UV source is directed to the mixture. Initially, the polymerization rate is slow due to the limited number of free radicals present in the system and the consumption of such radicals by available oxygen. However, at a certain time, depending upon 1) the concentration of UV photoinitiator provided, and 2) the composition of the monomer mixture, the polymerization rate increases rapidly and reaches a maximum peak. This rate increase is determined by measuring the heat generated from the reaction. After this "peak time" is reached, the reaction slows until the reaction reaches a point where the polymerization curve as plotted, levels. This point, where the reduced mobility of the molecules occurs and exothermic output from the polymerized mixture is near zero, is known as the "stall time". The monomer mixture will not polymerize past this point. "Complete" polymerization of a predominantly HEMA-based monomer is understood to be about 98% polymerization as determined by the amount of residual vinyl groups by near-infrared spectroscopy.

To determine the polymerization rate of a particular monomer mixture, both the peak time and the stall time must be considered. Increasing the polymerization so that the peak time is shortened without also decreasing the stall time, is meaningless when overall polymerization of the monomer mixture is the goal. It is desirable to decrease both the peak and stall times so that the polymerization reaction begins quickly and results in the rapid polymerization of the monomer mixture. Monomer mixtures which are predominantly made up of 2-hydroxyethyl methacrylate (HEMA) are known to polymerize rapidly (achieve stall time rapidly) once the peak time is reached. Therefore, for HEMA-containing systems, the challenge to reduce polymerization time is in the ability to achieve faster peak times.

Using known free radical initiators in known concentrations renders HEMA peak times ranging from 10 minutes to nearly 4 minutes. The method of the present invention increases the concentration of certain photoinitiators in HEMA-containing monomer mixtures to provide peak times of the polymerization process within the range of about 1 minute to about 3 minutes.

The actual amount of photinitiator used is dependent upon the desired peak time, which is in turn dependent upon the photoinitiator selected and the components of monomer mixture being polymerized. To polymerize the preferred HEMA-containing monomer mixtures of the present invention, photoinitiators are present in the monomer mixtures in amounts ranging from about 0.1 to about 1.0 weight percent, more preferably from about 0.2 to about 0.8 weight percent, with the most preferred concentration being from about 0.3 to about 0.7 weight percent.

The hydrogel HEMA-containing films and HEMA-containing lenses of the present invention, cast at the enhanced polymerization rate, surprisingly possessed lower modulus and higher tear strength values as compared to known lenses and films which took much longer to polymerize. Furthermore, the hydrogels of this invention displayed lower modulus values and higher tear strength values while showing no appreciable change in other important physical characteristics. For example, as the concentration of UV initiator was increased, water contents and % extractables remained approximately the same.

"Softness" or "stiffness" of the lens material is often characterized in terms of the lens material's modulus. Modulus is measured in terms of $g/mm^2$. Therefore, the "stiffer" the material, the higher is the material's modulus value. The modulus values of hydrogel contact lenses range widely in the field. The lenses made according to the process of the present invention preferably range from about 15 to about 60 $g/mm^2$, more preferably from about 20 to about 50 $g/mm^2$, and most preferably from about 25 to about 40 $g/mm^2$.

Tear strength is a measure of the lens material's resistance to tearing and is measured in terms of g/mm. Mechanical testing was conducted in buffered saline on an Instron instrument according to the ASTM D-1938 (tear strength) procedures. The lenses prepared according to the present methods must have a tear strength value greater than about 2 g/mm to be acceptable for use as contact lenses. It is understood that the most desirable formulations of the present invention will have the highest possible tear strength. Preferably the tear strength values range from about 2 to about 15 g/mm, more preferably from about 4 to about 10 g/mm, and most preferably from about 5 to about 8 g/mm.

The monomer mixtures of this invention may include other monomeric components such as crosslinking monomers. Preferably the monomer mixtures comprise a crosslinking monomer having multiple and varied polymerizable functionalities, preferably vinyl functionalities. Representative crosslinking monomers include divinylbenzene, allyl methacrylate, ethyleneglycol di(meth)acrylate, tetraethyleneglycol di(meth)acrylate, polyethyleneglycol di(meth)acrylate, and vinylcarbonate derivatives of the glycol di(meth)acrylates, with ethylene glycol di(meth)acrylate being the most preferred.

In addition to monomeric components and photoinitiator, the monomer mixtures may also include other materials. Such other preferred materials include tints, UV absorbers, diluents, etc. as would be apparent to one skilled in the art.

Diluents that may be employed include glycerine, diethylene glycol, ethylene glycol, ethylene glycol dimethyl ether, ethanol, water, and N-methyl pyrrolidone, with glycerine being most preferred. Glycerine is preferably present in the preferred HEMA-containing monomer mixtures in an amount of from about 5 to about 50 weight percent, and more preferably from about 10 to about 35 weight percent.

The following examples are provided only as illustrations of the preferred embodiments of the present invention and are not meant to be fully inclusive, and should not be construed as limiting the invention. The following abbreviations are used throughout the examples to represent the listed UV photoinitiators:

DMPAP=2,2-dimethoxy-2-phenylacetophenone;
BME=benzoin methyl ether;
HDMAP=2-hydroxy-2,2-dimethyl acetophenone; and
D-3331=Darocure 3331.

EXAMPLES 1

In this example, the gel test was used to determine peak time of the following polymerization system:

| | |
|---|---|
| HEMA | 85 wt. % |
| glycerine | 15 wt. % |
| EGDMA | 0.34 wt. % |
| DMPAP | 0.17 wt. % |

The instant heat generated over the course of polymerizing the monomer formulation was measured using a differential scanning calorimeter. During the test, 40 microliters of the monomer mix was placed in an aluminum pan blanketed with nitrogen and exposed to a UV lamp. A Sylvania F4T5/350BL lamp was used which gives broad emission between 300–400 nm with peak at 350 nm. The profile of heat generated was viewed on a monitor screen and plotted into charts as a function of time. The recorded peak time was 3.01 minutes.

To test modulus, tear strength, water content and extractables, hydrogel films were produced. The above monomer mixture was introduced between two glass plates measuring 10 cm×8 cm and cured under a UV lamp for 2 hours. The film thickness was controlled by a teflon gasket which gave a relatively consistent thickness of 0.25 mm. The films were extracted with boiling water for about 4 hours and then swollen to equilibrium in buffered saline. Mechanical testing was conducted in buffered saline on an Instron instrument according to the ASTM D-1708 (tensile) and ASTM D-1938 (tear strength) procedures and were reported in $g/mm^2$ for modulus and g/mm for tear strength. The % extractables and water contents were measured gravimetrically as would be understood by one skilled in the field. The following physical properties were recorded for the above formulation:

| | |
|---|---|
| % Extractables | 16.8 |
| % Water | 39.6 |
| Modulus | 25 $g/mm^2$ |
| Tear strength | 7 g/mm |

EXAMPLE 2

The following formulation was polymerized, and the peak time recorded using the method as described in Example 1:

| | |
|---|---|
| HEMA | 85 wt. % |
| glycerine | 15 wt. % |
| EGDMA | 0.34 wt. % |
| DMPAP | 0.34 wt. % |

Peak Time—2.28 min.
Additional physical properties were not recorded. Twice the amount of photoinitiator was used in this formulation as was used in Example 1. The peak time measurably decreased.

EXAMPLE 3

The following formulation was polymerized, and peak time recorded using the method as described in Example 1:

| | |
|---|---|
| HEMA | 85 wt. % |
| glycerine | 15 wt. % |
| EGDMA | 0.34 wt. % |
| DMPAP | 0.51 wt. % |

Peak Time—2.37 min.
The following physical properties were recorded as described in Example 1:

| | |
|---|---|
| % Extractables | 17.2 |
| % Water | 40.2 |
| Modulus | 25 $g/mm^2$ |
| Tear strength | 10 g/mm |

This formulation used three times the photoinitiator used in Example 1. The modulus value remained low, while the tear strength increased to 10 g/mm.

EXAMPLE 4

The following formulation was polymerized, and peak time recorded using the method as described in Example 1:

| | |
|---|---|
| HEMA | 85 wt. % |
| glycerine | 15 wt. % |
| EGDMA | 0.34 wt. % |
| DMPAP | 0.68 wt. % |

Peak Time—2.37 min.
The physical properties of this formulation were not determined.

EXAMPLE 5

The following formulation was polymerized and peak time recorded using the method as described in Example 1:

| | |
|---|---|
| HEMA | 85 wt. % |
| glycerine | 15 wt. % |
| EGDMA | 0.34 wt. % |
| BME | 0.17 wt. % |

Peak Time—3.61 min.
The following physical properties were recorded as described in Example 1:

| | |
|---|---|
| % Extractables | 16.4 |
| % Water | 39.7 |
| Modulus | 40 $g/mm^2$ |
| Tear strength | 6 g/mm |

EXAMPLE 6

The following formulation was polymerized, and peak time recorded using the method as described in Example 1:

| | |
|---|---|
| HEMA | 85 wt. % |
| glycerine | 15 wt. % |
| EGDMA | 0.34 wt. % |
| BME | 0.34 wt. % |

Peak Time 3.16 min.
The physical properties were not recorded.

EXAMPLE 7

The following formulation was polymerized and peak time recorded using the method as described in Example 1:

| | |
|---|---|
| HEMA | 85 wt. % |
| glycerine | 15 wt. % |

| EGDMA | 0.34 wt. % |
|---|---|
| BME | 0.51 wt. % |

Peak Time 3.07 min.
The following physical properties were measured and recorded as described in Example 1:

| % Extractables | 16.7 |
|---|---|
| % Water | 40.3 |
| Modulus | 25 g/mm² |
| Tear strength | 8 g/mm |

EXAMPLE 8

The following formulation was polymerized, and peak time recorded using the method as described in Example 1:

| HEMA | 85 wt. % |
|---|---|
| glycerine | 15 wt. % |
| EGDMA | 0.34 wt. % |
| BME | 0.68 wt. % |

Peak Time 3.00 min.
The physical properties were not recorded.

EXAMPLE 9

The following formulation was polymerized, and peak time recorded using the method as described in Example 1:

| HEMA | 85 wt. % |
|---|---|
| glycerine | 15 wt. % |
| EGDMA | 0.34 wt. % |
| HDMAP | 0.17 wt. % |

Peak Time 4,01 min.
The following physical properties were measured and recorded as described in Example 1:

| % Extractables | 15.6 |
|---|---|
| % Water | 38.5 |
| Modulus | 40 g/mm² |
| Tear strength | 6 g/mm |

EXAMPLE 10

The following formulation was polymerized, and peak time recorded using the method as described in Example 1:

| HEMA | 85 wt. % |
|---|---|
| glycerine | 15 wt. % |
| EGDMA | 0.34 wt. % |
| HDMAP | 0.34 wt. % |

Peak Time 3.36 min.
The physical properties were not recorded.

EXAMPLE 11

The following formulation was polymerized, and peak time recorded using the method as described in Example 1:

| HEMA | 85 wt. % |
|---|---|
| glycerine | 15 wt. % |
| EGDMA | 0.34 wt. % |
| HDMAP | 0.51 wt. % |

Peak Time 3.27 min.
The following physical properties were measured and recorded as described in Example 1:

| % Extractables | 14.4 |
|---|---|
| % Water | 38.1 |
| Modulus | 40 g/mm² |
| Tear strength | 6 g/mm |

EXAMPLE 12

The following formulation was polymerized, and peak time recorded using the method as described in Example 1:

| HEMA | 85 wt. % |
|---|---|
| glycerine | 15 wt. % |
| EGDMA | 0.34 wt. % |
| HDMAP | 0.68 wt. % |

Peak Time 3.20 min.
The physical properties were not recorded.

In the following Comparative Examples A–D, Darocure-3331 (EM Industries) was used as the photoinitiator. Similar concentrations were used as in the previous examples, but the peak times were much slower.

Comparative Example A

The following formulation was polymerized, and peak time recorded using the method as described in Example 1:

| HEMA | 85 wt. % |
|---|---|
| glycerine | 15 wt. % |
| EGDMA | 0.34 wt. % |
| D-3331 | 0.17 wt. % |

Peak Time 10.42 min.
The following physical properties were measured and recorded as described in Example 1:

| % Extractables | 16.0 |
|---|---|
| % Water | 38.7 |
| Modulus | 50 g/mm² |
| Tear strength | 5 g/mm |

Comparative Example B

The following formulation was polymerized, and peak time recorded using the method as described in Example 1:

| HEMA | 85 wt. % |
|---|---|
| glycerine | 15 wt. % |
| EGDMA | 0.34 wt. % |
| D-3331 | 0.34 wt. % |

Peak Time 8.50 min.
The physical properties were not recorded.

Comparative Example C

The following formulation was polymerized, and peak time recorded using the method as described in Example 1:

| | |
|---|---|
| HEMA | 85 wt. % |
| glycerine | 15 wt. % |
| EGDMA | 0.34 wt. % |
| D-3331 | 0.51 wt. % |

Peak Time 8.31 min.
The following physical properties were measured and recorded as described in Example 1:

| | |
|---|---|
| % Extractables | 16.5 |
| % Water | 36.0 |
| Modulus | 55 g/mm$^2$ |
| Tear strength | 5 g/mm |

Comparative Example D

The following formulation was polymerized, and peak time recorded using the method as described in Example 1:

| | |
|---|---|
| HEMA | 85 wt. % |
| glycerine | 15 wt. % |
| EGDMA | 0.34 wt. % |
| HDMAP | 0.68 wt. % |

Peak Time 8.38 min.
The physical properties were not recorded.

The collective initiator concentrations and peak times of Examples 1–12 and Comparative Examples A–D are provided in Table 1 in composite form below for convenience.

TABLE 1

| | Peak Time (minutes) Conc. (Wt. %) | | | |
|---|---|---|---|---|
| Initiator | 0.17% | 0.34% | 0.51% | 0.68% |
| DMPAP | 3.01 | 2.28 | 2.37 | 2.58 |
| BME | 3.61 | 3.16 | 3.07 | 3.00 |
| HDMAP | 4.01 | 3.36 | 3.27 | 3.20 |
| Darocure-3331 | 10.52 | 8.50 | 8.31 | 8.38 |

The DMPAP (Examples 1–4) gave the fastest peak times for each initiator concentration shown, giving the fastest peak time at a concentration of about 0.34 wt. % (Example 2). The results show the screening effects which occur when the initiator reaches a certain concentration, as evidenced by the slightly slower peak times recorded for DMPAP concentrations of 0.51 and 0.68 wt. % (Examples 3 and 4, respectively) as compared with the peak time recorded at 0.34 wt. % DMPAP (Example 2).

Table 2 shows the comparative physical properties of the HEMA formulation (Examples 1 and 3) using the preferred photoinitiator, DMPAP at concentrations of 0.17 and 0.51 wt. %.

TABLE 2

| | Formulation (Example) | |
|---|---|---|
| Properties | Example 1 | Example 3 |
| % Extractables | 16.8 | 17.2 |
| % Water | 39.6 | 40.2 |
| Modulus (g/mm$^2$) | 25 | 25 |
| Tear strength (g/mm) | 7 | 10 |

The data shows that, as the DMPAP concentration was increased from 0.17 to 0.51 wt % the tear strength value increased from 7 to 10 g/mm while the modulus remained constant at 25 g/mm$^2$.

EXAMPLE 13

Film Polymerization Rate of HEMA Formulation
The following monomer mix formulation was prepared.

| Formulation | Wt. % |
|---|---|
| HEMA | 85 |
| EGDMA | 0.34 |
| Glycerine | 15 |
| DMPAP | 0.68 |
| Tint | 0.0060 |

The formulation was then placed between two silane-treated glass plates under a nitrogen blanket and UV polymerized under a Philips UV lamp having 3000 microwatts in light intensity. One film was cast for each formulation. After 3, 5, 10, 30 and 60 minutes, the polymer films between the glass plates were evaluated for residual vinyl groups by near-IR spectroscopy. Complete polymerization for a HEMA-based hydrogel material is understood to be greater than about 98% polymerization. The monomer mix formulation was fully polymerized in 3 minutes, representing a peak time of less than 3 minutes. As mentioned above, polymerization time was measured by measuring residual vinyl groups and therefore most closely relates to stall time as defined above. The stall time must occur after the peak time. Therefore, although peak time was not specifically determined, the peak times must be at least slightly faster than the reported "polymerization" times.

EXAMPLE 14

HEMA Lens Casting
The same formulation described in Example 13 was cast molded under the same UV lamp source. The samples were either manually cast molded or automatically cast molded using polypropylene molds. After 1, 2, 4, 6 and 10 minutes, the samples were removed from the UV cure and checked for residual vinyl content using near-IR spectroscopy. For the manually cast lenses, the HEMA formulation containing DMPAP (0.68 wt. %) polymerized after 1 minute under a nitrogen blanket, representing a peak time of less than 1 minute. For the automatically cast lenses, it took only 1.5 minutes to polymerize the HEMA formulation containing DMPAP under a nitrogen blanket, again, representing a peak time of less than 1.5 minutes. As in Example 13, the peak times were not measured directly. However, the reported "polymerization time" most directly relates to stall time. Therefore, the peak time occurred at a time faster than the reported "polymerization" time.

Many other modifications and variations of the present invention are possible to the skilled practitioner in the field in light of the teachings herein. It is therefore understood that, within the scope of the claims, the present invention can be practiced other than as herein specifically described.

I claim:

1. In a method of making a hydrogel from a polymerizable monomer mixture comprising 2-hydroxyethyl methacrylate, and a UV photoinitiator, the improvement of which comprises, polymerizing the monomer mixture under a UV lamp at a rate such that the peak time of the polymerization reaction of the monomer mixture is achieved in from about 1 minute to about 3 minutes and complete polymerization of the monomer mixture is achieved within about 3 minutes, the monomer mixture comprising at least 50 weight percent of 2-hydroxyethyl methacrylate and no more than about 1.0 weight percent of the photoinitiator.

2. The method of claim 1 wherein the UV photoinitiator is 2,2-dimethoxy-2-phenylacetophenone.

3. The method of claim 1 wherein the photoinitiator is present in the monomer mixture in an amount of from about 0.1 to about 1.0 weight percent.

4. The method of claim 1 wherein the photoinitiator is present in the monomer mixture in an amount of from about 0.3 to about 0.7 weight percent.

5. The method of claim 1 wherein the monomer mixture comprises from 50–95 weight percent of 2-hydroxyethyl methacrylate.

6. The method of claim 1 wherein the monomer mixture further comprises glycerine.

7. The method of claim 1 wherein the methacrylate-containing monomer mixture further comprises a crosslinking monomer.

8. The method of claim 7 wherein the crosslinking monomer is ethylene glycol dimethacrylate.

9. The method of claim 1 wherein the monomer mixture comprises 2-hydroxyethyl methacrylate, 2,2-dimethoxy-2-phenylacetophenone, glycerine and ethylene glycol dimethacrylate.

10. In a hydrogel formed from a polymerizable 2-hydroxyethyl methacrylate-containing monomer mixture comprising a UV photoinitiator, the improvement of which comprises, polymerizing the monomer mixture under a UV lamp at a rate such that the peak time of the polymerization reaction of the monomer mixture is achieved in from about 1 minute to about 3 minutes and complete polymerization of the monomer mixture is achieved within about 3 minutes, the monomer mixture comprising at least 50 weight percent of 2-hydroxyethyl methacrylate and no more than about 1.0 weight percent of the photoinitiator.

11. The hydrogel of claim 10 wherein the UV photoinitiator is selected from the group consisting of 2,2-dimethoxy-2-acetophenone, 2,2-diethoxy-2-acetophenone, and 2,2-dimethoxy-2-phenylacetophenone.

12. The hydrogel of claim 10 wherein the UV photoinitiator is 2,2-dimethoxy-2-phenylacetophenone.

13. The hydrogel of claim 10 wherein the photoinitiator is present in the monomer mixture in an amount of from about 0.1 to about 1.0 weight percent.

14. The hydrogel of claim 10 wherein the photoinitiator is present in the monomer mixture in an amount of from about 0.3 to about 0.7 weight percent.

15. The hydrogel of claim 10 wherein the monomer mixture comprises from 50–95 weight percent of 2-hydroxyethyl methacrylate.

16. The hydrogel of claim 10 wherein the methacrylate-containing monomer mixture further comprises a crosslinking monomer.

17. The hydrogel of claim 10 wherein the monomer mixture comprises 2-hydroxyethyl methacrylate, 2,2-dimethoxy-2-phenylacetophenone, glycerine and ethylene glycol dimethacrylate.

18. In a contact lens made from a hydrogel material formed from a polymerizable 2-hydroxyethyl methacrylate-containing monomer mixture comprising a UV photoinitiator, the improvement of which comprises, polymerizing the monomer mixture under a UV lamp at a rate such that the peak time of the polymerization reaction of the monomer mixture is achieved in from about 1 minute to about 3 minutes and complete polymerization of the monomer mixture is achieved within about 3 minutes, the monomer mixture comprising at least 50 weight percent of 2-hydroxyethyl methacrylate and no more than about 1.0 weight percent of the photoinitiator.

19. The contact lens of claim 18 wherein the UV photoinitiator is selected from the group consisting of 2,2-dimethoxy-2-acetophenone, 2,2-diethoxy-2-acetophenone, and 2,2-dimethoxy-2-phenylacetophenone.

20. The contact lens of claim 18 wherein the UV photoinitiator is 2,2-dimethoxy-2-phenylacetophenone.

21. The contact lens of claim 18 wherein the monomer mixture comprises 2-hydroxyethyl methacrylate, 2,2-dimethoxy-2-phenylacetophenone, glycerine and ethylene glycol dimethacrylate.

* * * * *